United States Patent
Boesche et al.

(10) Patent No.: US 6,208,536 B1
(45) Date of Patent: Mar. 27, 2001

(54) SAFETY DEVICE FOR A DRIVE MECHANISM

(75) Inventors: Guenther Boesche, Michelstadt; Rupert Weber, Schneeberg; Olaf Kunz, Grasellenbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,545

(22) PCT Filed: Apr. 7, 1999

(86) PCT No.: PCT/DE99/01029

§ 371 Date: Mar. 31, 2000

§ 102(e) Date: Mar. 31, 2000

(87) PCT Pub. No.: WO99/53588

PCT Pub. Date: Oct. 21, 1999

(30) Foreign Application Priority Data

Apr. 9, 1998 (DE) .............................. 198 16 046

(51) Int. Cl.$^7$ .............................. H02M 5/45; H02H 7/10
(52) U.S. Cl. .................................. 363/37; 363/50
(58) Field of Search .................... 363/50, 52, 53, 363/55, 56.01, 34, 37

(56) References Cited

U.S. PATENT DOCUMENTS

| 4,642,475 | * | 2/1987 | Fischer et al. | 307/66 |
| 5,255,178 | * | 10/1993 | Liberati | 96/80 |

FOREIGN PATENT DOCUMENTS

| 680 067 | 6/1992 | (CH) . |
| 43 30 823 | 3/1995 | (DE) . |
| 196 53 421 | 6/1998 | (DE) . |
| 2 281 826 | 3/1995 | (GB) . |

* cited by examiner

*Primary Examiner*—Matthew Nguyen
(74) *Attorney, Agent, or Firm*—Kenyon & Kenyon

(57) ABSTRACT

A safety device for a drive is includes a monitoring system which evaluates a value describing the operating state of the drive in order to ascertain whether an emergency operation should be started for the protection of the drive instead of normal operation. The monitoring system generates at least one first output signal for an actuating element that influences the power supply to the drive. In normal operation an a.c. signal is used as the output signal and in emergency operation a d.c. signal is used.

5 Claims, 2 Drawing Sheets

SAFETY DEVICE FOR A DRIVE MECHANISM

BACKGROUND INFORMATION

A drive device with a safety device for special operation is described in German Patents No. 43 30 823. In this patent a redundant safety device is provided to monitor the motor, verifying that the motor speed does not exceed a predetermined maximum value in special operation and to interrupt the power supply to the motor when the rotational speed is greater than the predetermined maximum value. To determine the rotational speed, two different signals are detected so that the first signal is obtained from a rotational speed sensor and the second signal is derived in at least one phase feeder to the motor from the variation of current over time detected for this purpose by a second sensor. If the detected rotational speed exceeds a predetermined maximum value, the energy supply to the motor is interrupted by switching a circuit breaker upstream from a power rectifier and in addition switching off the power inverter.

Additional monitoring of the actuation signals for the interruption of the power supply is however not provided. A break in a feeder or a short-circuit is not monitored separately.

SUMMARY OF THE INVENTION

The safety device for a drive according to the present invention is provided with a monitoring system, which evaluates a measured value describing the operating state of the drive in order to ascertain whether an operation in emergency mode should be started to replace operation in normal mode. The monitoring system generates at least one first output signal for an actuating element that influences the power supply to the motor. In the safety device according to the present invention for a drive, an a.c. signal is used in normal operation as the output signal and a d.c. signal is used in emergency operation. Thanks to the pre-definition of the form of the output signal, the d.c. signal transmitted on purpose for emergency operation also applies to the operating state which occurs in case of short-circuit or rupture of the feeder which transmits the output signal. A signal monitoring system is thereby enabled to actuate the appropriate actuating elements for an emergency operation in case of an emergency operation initiated on purpose, as well as in a critical situation caused by a feeder rupture or a short-circuit. No separate system to monitor the operability of the feeder is needed.

In an advantageous further development, the actuating element is assigned a signal monitoring system, which monitors the output signal and actuates the actuating element for an emergency operation when the input signal, which matches the output signal when the feeder is working properly, is a d.c. signal. The signal monitoring system is preferably located in the immediate proximity of the actuating element in order to thus minimize signal transmission errors.

In an advantageous further development, the output signal is transmitted via a bus. The above described safety function can be integrated into the signal processing which is necessary for the exchange of bus signals. A suitable hardware or software design only insignificantly increases the electronics costs, which is necessary in any case to operate the bus system.

DETAILED DESCRIPTION.

Figure 1:
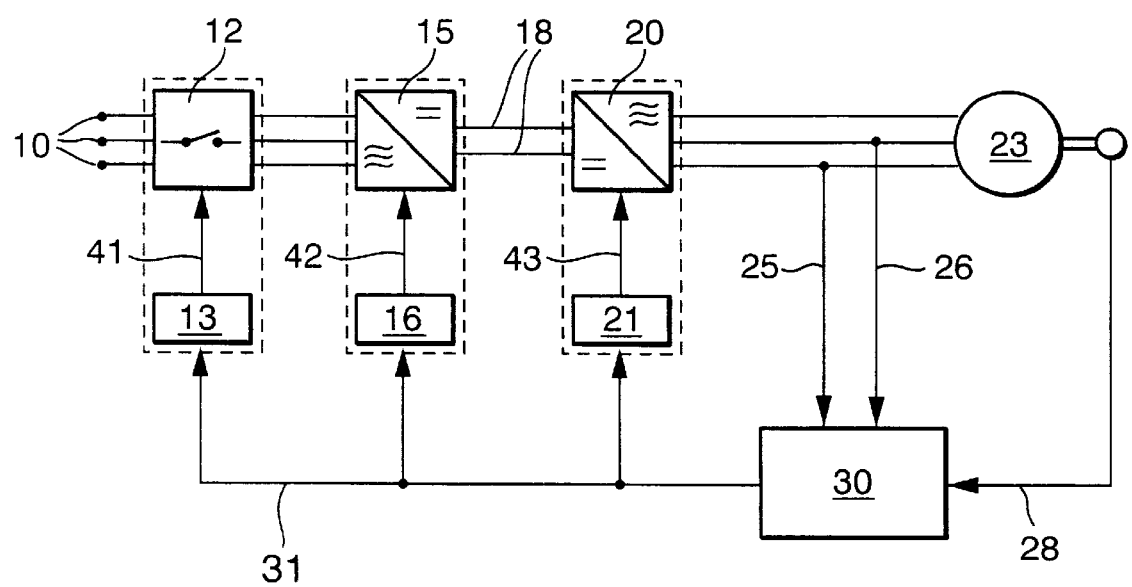
FIG. 1 shows a block diagram of the safety device according to the present invention.

Referring to FIGS. 1, 2 three-phase a.c. network 10 is connected via a circuit breaker 12 to a line rectifier 15. Line rectifier 15 feeds an intermediate d.c. voltage circuit 18 whose d.c. voltage is converted by a d.c.-a.c. converter 20 into an a.c. current supplied to a drive 23. A first current value 25 is measured at a first drive feeder and a second current value 26 is measured at a second phase feeder, both current values being transmitted to a monitoring system 30 together with a rotational speed value 28 of drive 23. Monitoring system 30 generates an output signal 31, which is transmitted to a first signal monitor 13. First signal monitor 13 produces a first emergency control signal 41 as a function of output signal 31, prompting circuit breaker 12 to carry out a switching action as required. Depending on output signal 31 provided by monitoring system 30, a second signal monitor 16 produces a second emergency control signal 42 for line rectifier 15. Depending on output signal 31 provided by monitoring system 30, a third signal monitor 21 provides a third emergency control signal 43 for d.c.-a.c. converter 20.

A suitable signal evaluation device which decides whether emergency operation 35 should be started based on the input signals such as first and second current values 25, 26 and/or rotational speed value 28 is integrated into monitoring system 30. If the measured values exceed predetermined values for example—this points to the rotational speed having been unintentionally exceeded—emergency operation 35 is actuated at a point in time T0, FIG. 2a. Any additional values, such as, e.g., the intermediate circuit d.c. voltage can trigger emergency operation 35.

Figure 2A:
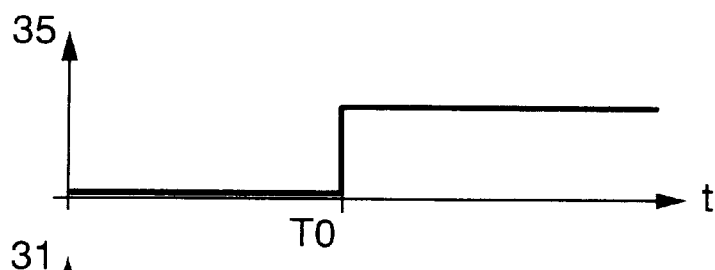
FIG. 2a shows a first exemplary signal curve for the safety device for a drive according to the present invention.
Figure 2B:
FIG. 2b shows a second exemplary signal curve for the safety device for a drive according to the present invention.
Figure 2C:
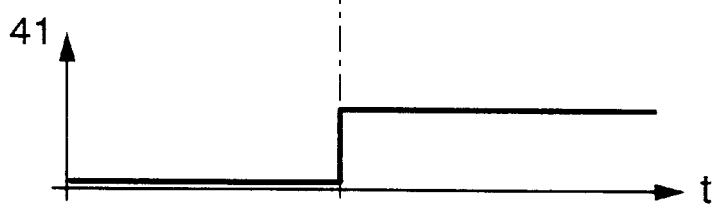
FIG. 2c shows a third exemplary signal for the safety device for a drive according to the present invention.
Figure 2D:
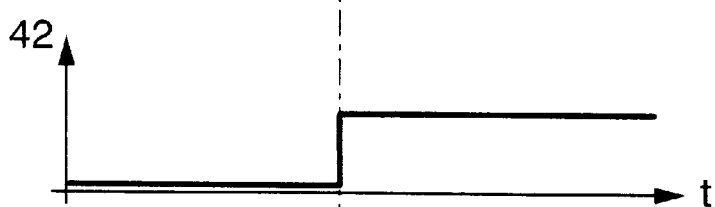
FIG. 2d shows a fourth exemplary signal for the safety device for a drive according to the present invention.
Figure 2E:
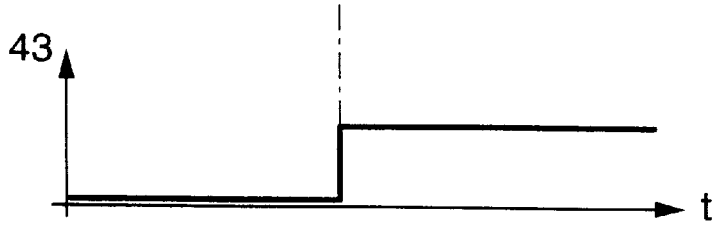
FIG. 2e shows a fifth exemplary signal for the safety device for a drive according to the present invention.

In normal operation, monitoring system 30 produces an a.c. signal as output signal 31, as shown in FIG. 2b. In the embodiment given as an example, circuit breaker 12, line rectifier 15 and d.c.-a.c. converter 20 are provided as actuating elements. Circuit breaker 12 is associated with a first signal monitor 13. An electronic evaluation system is integrated in this first signal monitor 13 and monitors output signal 31 in order to ascertain whether the incoming output signal 31 is an a.c. signal or a d.c. signal. In case of an incoming a.c. signal, first signal monitor 13 concludes that the operating state of drive 23 or of the corresponding actuation is normal. However, as soon as the incoming output signal 31 is identified as a d.c. voltage signal, the first signal monitor 13 starts emergency operation 35 for the circuit breaker 12, e.g., by transmitting a command to open as the first emergency control signals 41 to the safety switches. Emergency operation 35 of the corresponding actuation element can be stored in a different manner for each one in each signal monitor 13, 16, 21. However, the incoming output signal 31 is evaluated in the same manner in all signal monitors 13, 16, 21. A d.c. signal is interpreted as an event, which initiates an emergency operation 35.

Figure 2F:
FIG. 2f shows a sixth exemplary signal for the safety device for a drive according to the present invention.
Figure 2G:
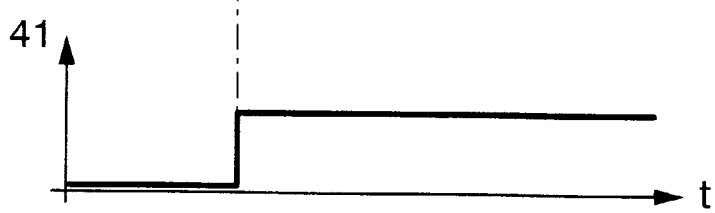
FIG. 2g shows a seventh exemplary signal for the safety device for a drive according to the present invention.

The safety device according to the present invention makes it possible to also detect other critical operating conditions such as a cable breakage. FIG. 2f and FIG. 2g show the variation of output signal 31 and of one of the corresponding emergency control signals 41 in such a case. At point in time T1 the circuit transmitting output signal 31 to signal monitors 13, 16, 21 is however interrupted by force. This causes the level of output signal 31 to drop to zero. Signal monitors 13, 16, 21 recognize that this is a d.c. signal. According to FIG. 2g, first signal monitor 13 selected as an example actuates circuit breaker 12 via emergency control signal 41 in the form of an emergency operation 35. A similar action is taken if a short-circuit occurs in the line. Again a d.c. signal is emitted instead of the a.c. signal corresponding to normal operation and it is again evaluated by signal monitor 13, 16, 21 for an emergency operation 35.

Other embodiments are possible. Thus output signals 31, 32, 33 could for instance be also transmitted via a bus system. This enables a bi-directional exchange of data. In principle, actuating elements 12, 15, 20 can be wired in such a manner that they exchange signals, which are monitored in the described manner. It is also possible to integrate monitoring system 30 into the controls of d.c.-a.c. converter 20. This is because the supplied values such as first actual current value, second actual current value 25, 26 and rotational speed values 28 can also be used in the corresponding control of d.c.-a.c. converter 20.

Similarly, input signals such as "especial operation" can be transmitted in order to actuate several monitoring systems 30 at the same time.

The present invention is not limited to monitoring and triggering an emergency operation of a drive.

What is claimed is:

1. A safety device for a drive comprising:

a monitoring system evaluating at least one value describing an operating state of the drive in order to ascertain whether an emergency operation, instead of a normal operation, is to be started for a protection of the drive, the monitoring system generating at least one output signal, an a.c. signal being used in the normal operation and a d.c. signal being used in the emergency operation as the output signal; and at least one actuating element receiving the output signal and influencing a power supply to the drive as a function of the output signal.

2. The safety device according to claim 1, further comprising a signal monitor associated with the at least one actuating element, the signal monitor monitoring the output signal and triggering the at least one actuating element to initiate the emergency operation if the output signal is a d.c. signal.

3. The safety device according to claim 1, further comprising a bus transmitting the output signal.

4. The safety device according to claim 1, wherein the at least one actuating element includes at least one of a circuit breaker, a line rectifier and a d.c.-a.c. converter.

5. The safety device according to claim 2, wherein the signal monitor stores an emergency program for the at least one actuating element.

* * * * *